United States Patent [19]

Duzich

[11] 4,115,754

[45] Sep. 19, 1978

[54] AIRCRAFT ONBOARD OPERATIONAL STATUS INDICATOR

[75] Inventor: John J. Duzich, Oakdale, N.Y.

[73] Assignee: Grumman Aerospace Corporation, Bethpage, N.Y.

[21] Appl. No.: 753,276

[22] Filed: Dec. 22, 1976

[51] Int. Cl.² .............................................. G08B 5/36
[52] U.S. Cl. ................................ 340/27 R; 340/521; 340/525
[58] Field of Search .............. 340/27 R, 27 AT, 52 F, 340/213 R, 214, 415, 324 R, 378 R, 212, 309.1; 73/178 I, 179, 182

[56] References Cited

U.S. PATENT DOCUMENTS

| 2,309,941 | 2/1943 | Drummond | 340/52 H |
|---|---|---|---|
| 2,917,731 | 12/1959 | Rodgers | 340/27 R |
| 2,934,752 | 4/1960 | Arrasmith | 340/27 R |
| 3,585,375 | 6/1971 | Hedrick | 340/309.1 |
| 3,665,439 | 5/1972 | Brummer et al. | 340/27 R |
| 3,706,087 | 12/1972 | Berns | 340/213 R |
| 3,736,796 | 6/1973 | Hohenberg | 340/27 R |
| 3,798,596 | 3/1974 | Sumiyoshi et al. | 340/52 F |
| 3,900,828 | 8/1975 | Lage et al. | 340/27 R |
| 3,906,437 | 9/1975 | Brandwein et al. | 340/27 R |
| 3,967,281 | 6/1976 | Dageford | 340/52 F |

*Primary Examiner*—John W. Caldwell, Sr.
*Assistant Examiner*—James J. Groody
*Attorney, Agent, or Firm*—Richard G. Geib; Mellor A. Gill

[57] ABSTRACT

An indicator panel on the exterior of an airplane having indicators operatively connected to systems and components with switches interposed to provide on call to an observer outside of the airplane the ability to function of the indicators in checking the airplane's previous inflight and post flight operational status of such systems and components of the vehicle with the indicators being grouped on the panel as to the various systems and components.

5 Claims, 29 Drawing Figures

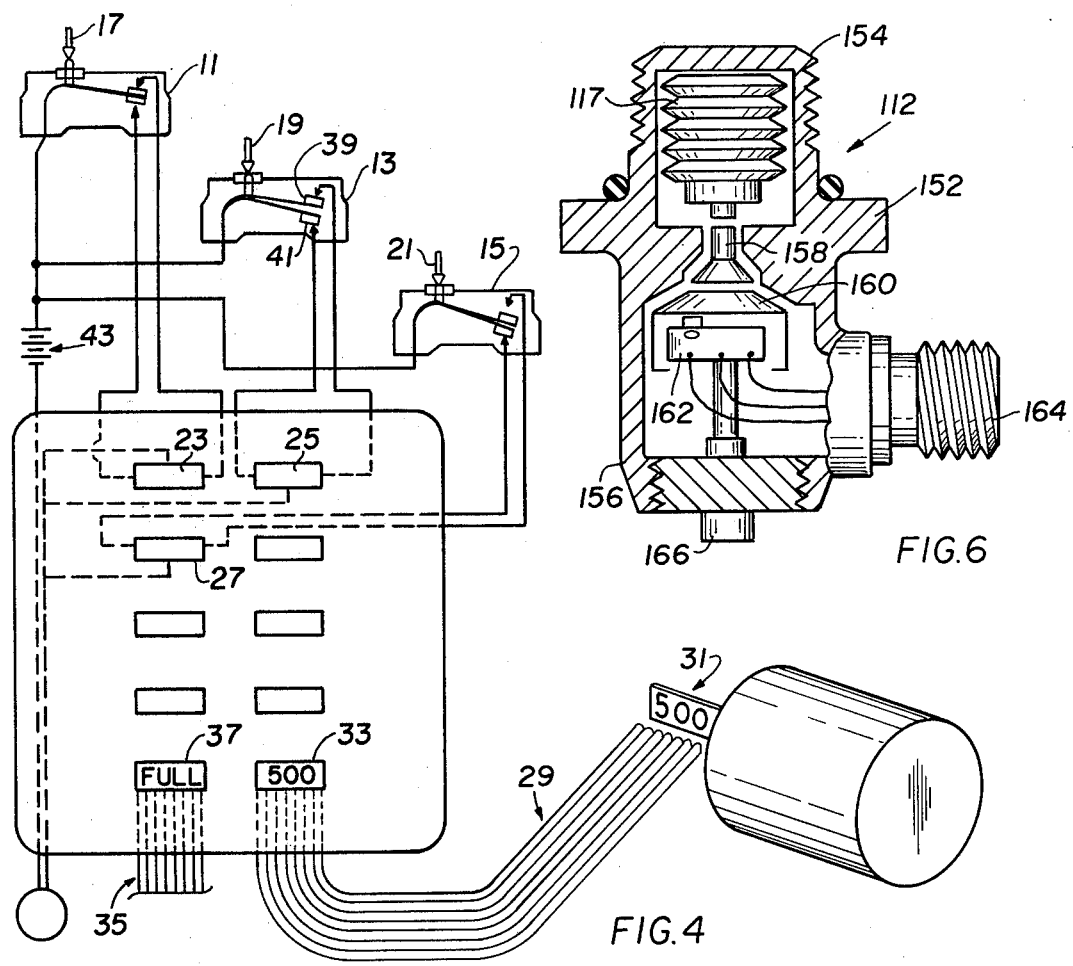
FIG.6
FIG.4
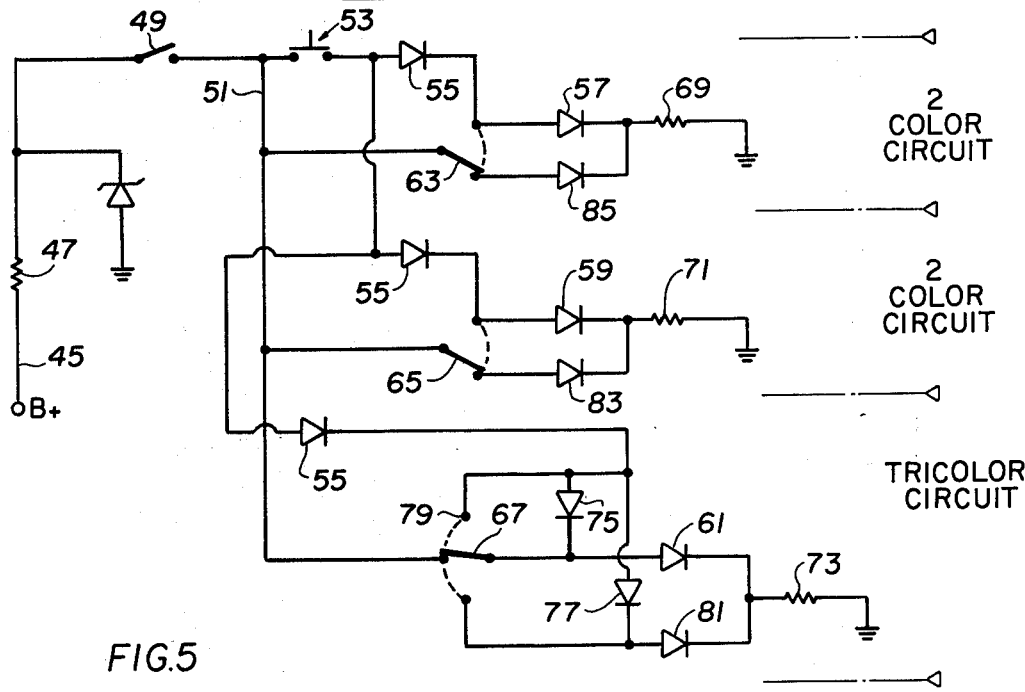
FIG.5

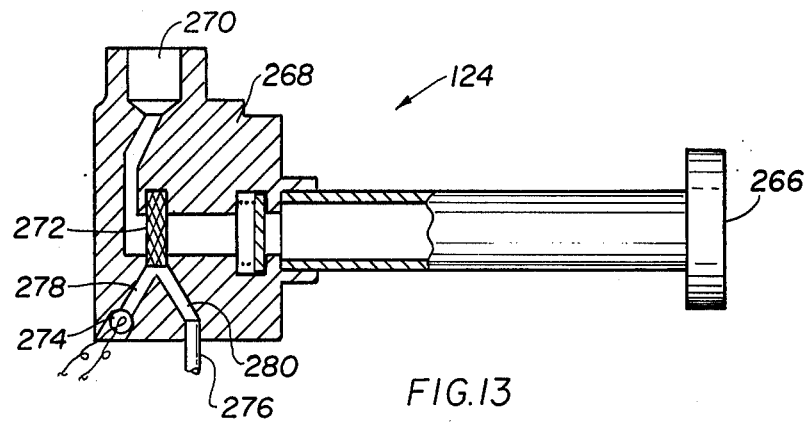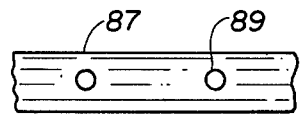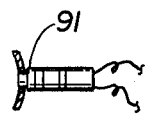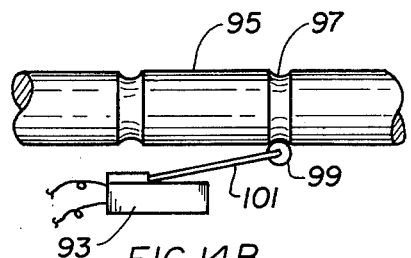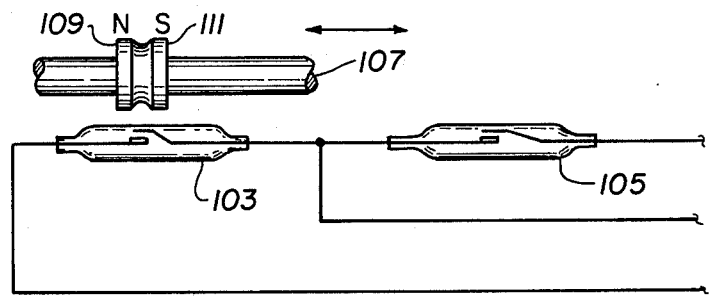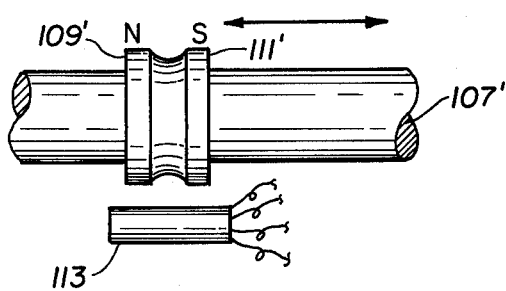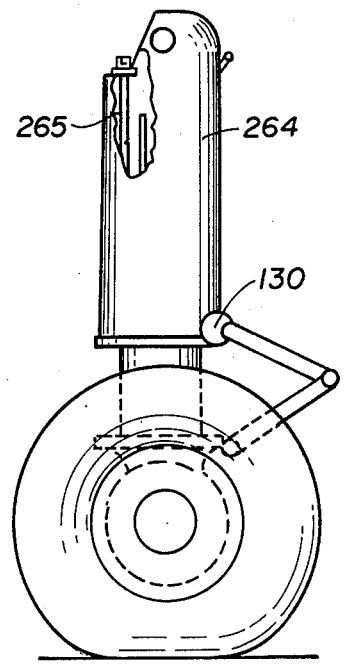

AIRCRAFT ONBOARD OPERATIONAL STATUS INDICATOR

BACKGROUND

This invention relates to indicating apparatus for such things as pneumatic and hydraulic systems of an aircraft which is located and adapted for ready observation in operation by ground personnel.

It has been heretofore conventional to provide ground support equipment to provide test funtions to and derive information from an aircraft's pneumatic and/or hydraulic systems. Such apparatus has indicators for recording and visual observation of the tests.

Examples of the aforesaid prior apparatus are shown by U.S. Pat. Nos. 2,310,974 and 3,418,843 to show the general feeling of how the art has been stereotyped since the early 40's. More recently it has been proposed to provide indicators to vehicle operators so that such may diagnose maintenance needs. Such is the intent of U.S. Pat. No. 3,626,367.

It has also been known in the prior art for aircraft operators that one can know when controls, instruments and devices on board an aircraft are ready to function in any certain flight or ground mode of operation. Such is found in U.S. Pat. No. 2,259,123.

None of these prior art disclosures, however, provide with a miniature display panel conveniently located and permanently installed a simple maintenance tool to gather trend information on degradation of critical system components and functions in simple lighted, go, no-go, possible, indications.

SUMMARY

Accordingly, it is an object of this invention to disclose to the art a means to provide a panel of indicators for use by anyone exteriorly of an aircraft viewing same for quick post/pre-flight check-out of vital system components and functions based upon previous operation and ground run-up as required.

A more particular object of this invention is to provide a panel of indicators on the exterior surface of an aircraft that are themselves operationally testable and which on command can provide go, possible, no-go visual indication of system:
A. Temperature,
B. Fluid Flow,
C. Fluid Pressure,
D. Fluid Level (Volume),
D. Differential Pressure,
F. Hours of Operation,
as a probe of variables against preset standard conditions.

It is an additional object of this invention to reduce the pre-flight checkout time, which could average without this invention to 0.65 hours, to less than 30 seconds, the time to push a button and scan a panel of lights, whereby several man-hour per day maintenance time can be saved in monitoring components such as reservoirs, pumps, accumulators, pneumatic bottles, shock struts, flight control actuators, desiccants, relief valves, etc.

It is an even more specific characterization of the objects of this invention to provide an indicator mounted on the exterior surface of an aircraft that will:
1. Reduce preflight system checkout time;
2. Maintain an inflight monitoring of system components;
3. Provide post-flight readings of inflight operational characteristics and/or component functioning;
4. Eliminate visual system/component checks;
5. Maximize service interval of systems and components to an "as required" basis instead of on a scheduled per hour operation basis; and
6. Facilitate early detection without specialist training and data interpretation of component or system failure.

DRAWING DESCRIPTION

FIG. 4 is an illustration showing electrical circuitry with pressure switches and visual circuitry with numerical readout means for providing indication on the panel means of FIG. 2;

FIG. 5 is electrical circuitry for a light emitting diode system of monitoring with signal means such as the pressure switches of FIG. 4;

FIG. 6 is a cross-sectional view of a thermal switch to provide electrical signals and visual indication of excessive temperature;

FIG. 13 is a partial cross-sectioned view of a desiccant saturation monitor with fiber-optic reading means;

FIG. 14A and 14A-1 are illustrations of a bootstrap type reservoir tape indicator;

FIG. 14B is a pneumatic operated indicator switch means;

FIGS. 15 and 16 are schematic illustrations of magnetically operable indicators i. e. Reed and Hall effect switches;

FIG. 17 is an illustration of an airplane shock absorber and wheel having both a means for fluid level measurement and a rotary potentiometer for cylinder displacement indication.

DETAILED DESCRIPTION

Figure 1:
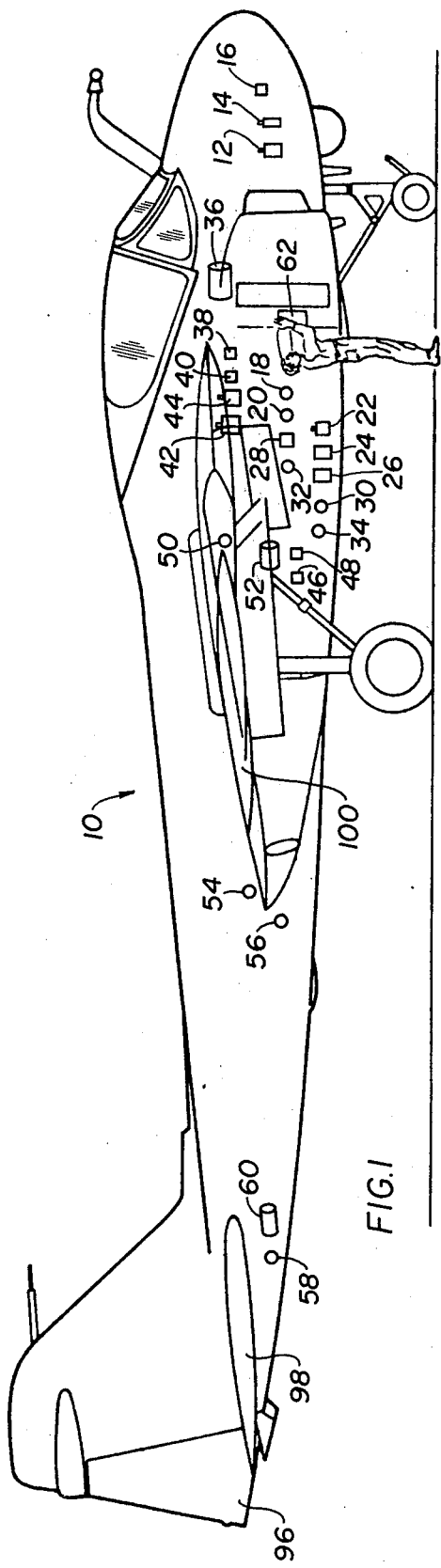
FIG. 1 is a side view of an airplane having superimposed thereon various system components illustrative, but not all inclusive of those monitored by this invention.

With more particular reference to FIG. 1 there is shown an aircraft 10 having as is usual components requiring maintenance and/or checking scattered throughout the entire vehicle. An example of such components superimposed at various locations on the aircraft 10 are:

12 Emergency Landing Gear Pressure Bottle
14 Canopy Jettison Bottle
16 Wheel Brake Accumulator
18 Pump Pressure Line Filter
20 Pump Drain Line Filter
22 Emergency Landing Gear Pressure Bottle
24 Accumulator
26 Accumulator, Combined Systems
28 Accumulator, Flight Systems
30 Combined Systems Return Line Filter
32 Flight Systems Return Line Filter
34 Combined Systems Pump Pressure Line Filter
36 Flight System Reservoir
38 Flight Reservoir Air Dryer
40 Flight Reservoir Air Regulator
42 Emergency Landing Gear Pressure Bottle
44 Emergency Landing Gear Pressure Bottle
46 Combined Systems Reservoir Air Regulator
48 Combined Systems Reservoir Air Dryer
50 Combined Systems Pump Case Drain Filter
52 Combined Systems Reservoir
54 Flight Control System Filter
Combined Control System Filter
58 Back-up System Filter
60 Back-up System Reservoir As will be readily appreciated by those skilled in the art it would be desirable to obtain information on these components and systems they are in by monitoring pressure in items 12, 14, 16, 22, 24, 26, 28, 40, 42, 44 and 46; differential pressure in items 18, 20, 30, 32, 34, 50, 54, 56, 58 and 60; flow via items 18, 20, 34 and 50; temperature in items 20 and 50; saturization related to items 38 and 48; and, level of reservoirs 36 and 52. To be sure there could be many more items mentioned but these are believed to exemplify the varied types of monitoring and locations that are known in most present aircraft to be required.

Again referring to FIG. 1 it is proposed by this invention to bring to one location, such as area 62 visible and accessible to a person on the ground, a means to monitor things such as the 35 readouts exampled statically and dynamically on a go/no-go basis. The monitoring is proposed to occur during flight and ground operation so that a malperforming or defective system, as of last operation, can be readily pin-pointed. This monitoring is, as indicated, and for example including but not limited to measuring and comparing variables against preset standard limits in temperature, flow, pressure, fluid level (volume), differential pressure, fluid color changes (density) and hours of operation.

Figure 3:
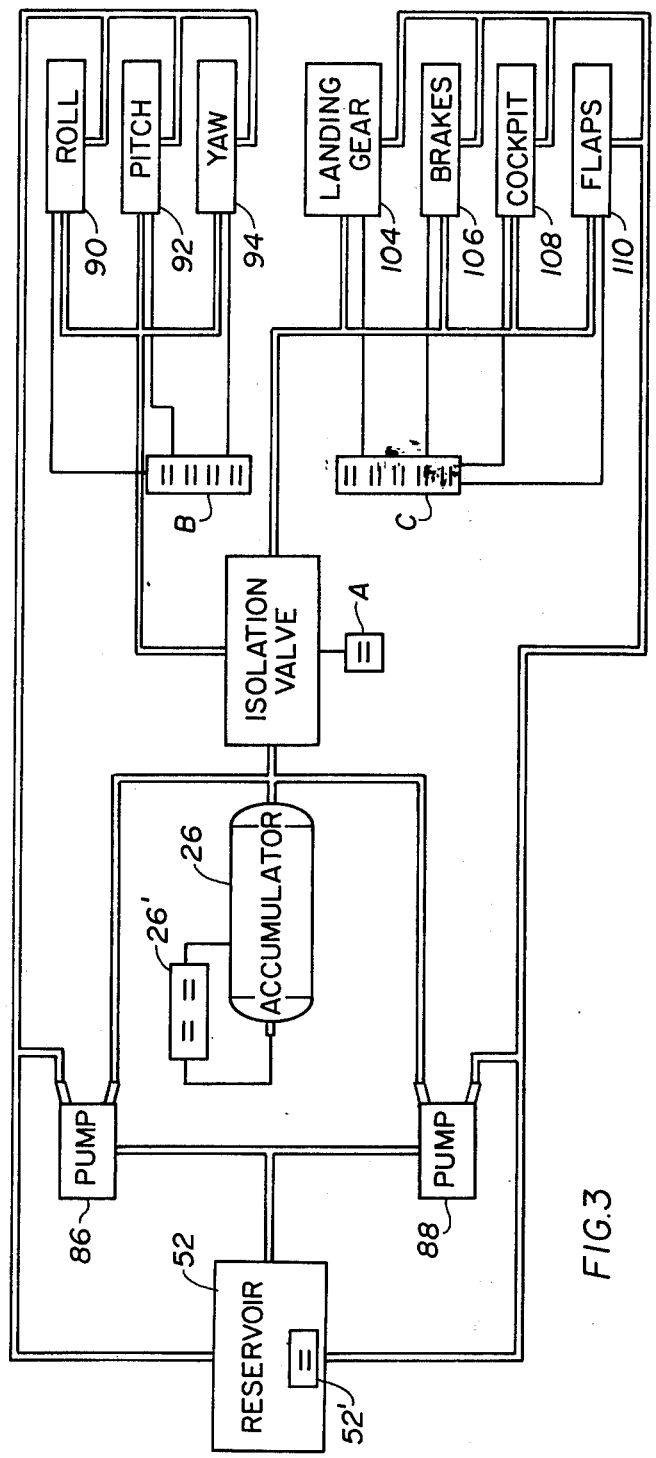
FIG. 3 is a block diagram of a combined flight and utility hydraulic system capable of being monitored by this invention.
Figure 2:
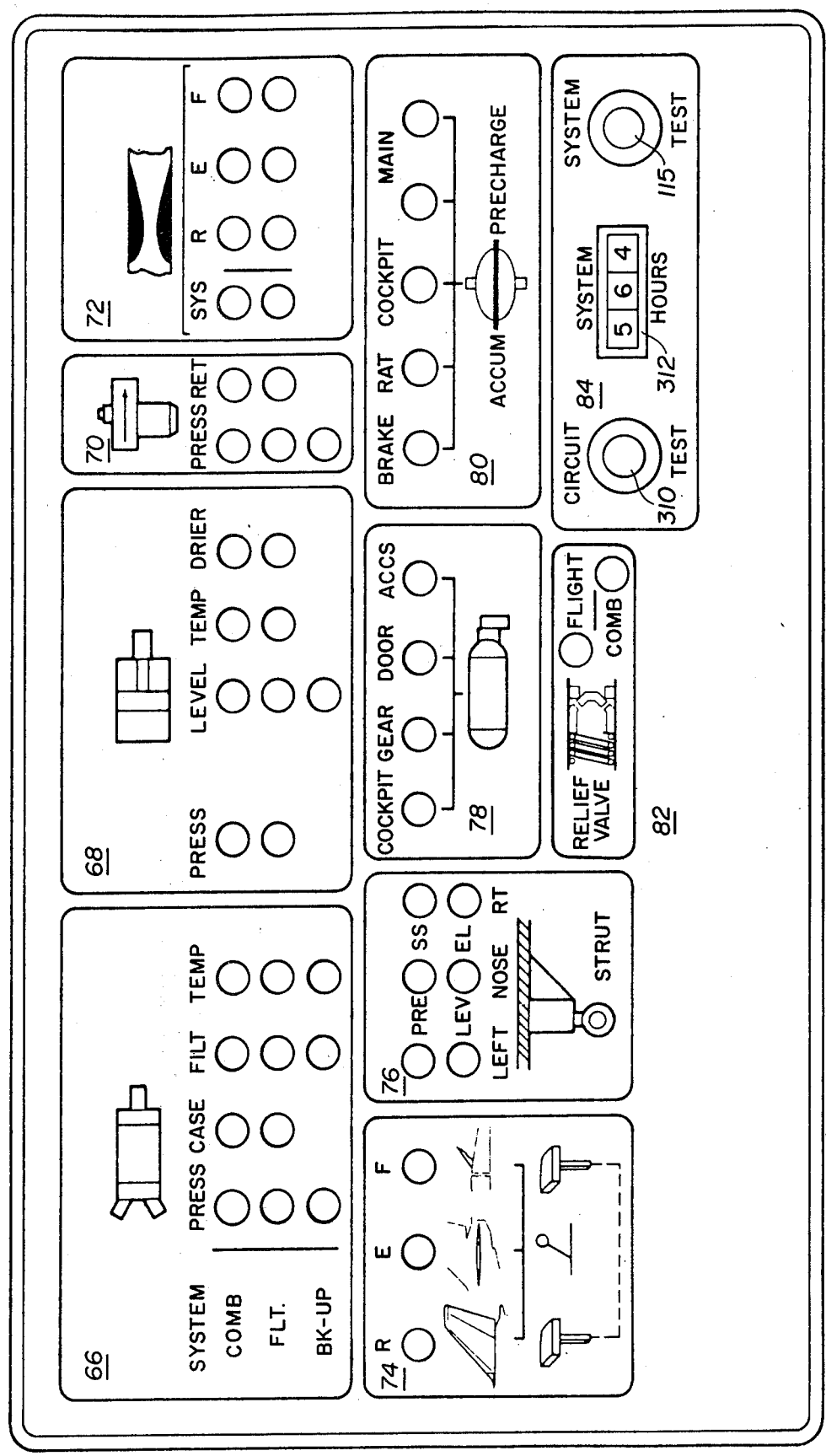
FIG. 2 is a side view of a monitoring panel in accordance with this invention.

A typical panel 64 is shown in FIG. 2 which comprises visual indicators integrated to numerous aircraft systems with appropriate sensing means by connections 52', 26', A, B and C shown by FIG. 3. As is well known, the sensing means and connections will be within the skill of the art of electrical, mechanical, optical and pressure indicator systems, part being discussed hereinafter in greater detail for illustration of this fact. This panel includes three sections having appropriate visual indicators so that when activated as by circuit test means (See FIG. 2A) or system test means (See FIG. 2B) as shown they may indicate, as by illumination of red, yellow or green LED's, system and component status.

Figure 2A:
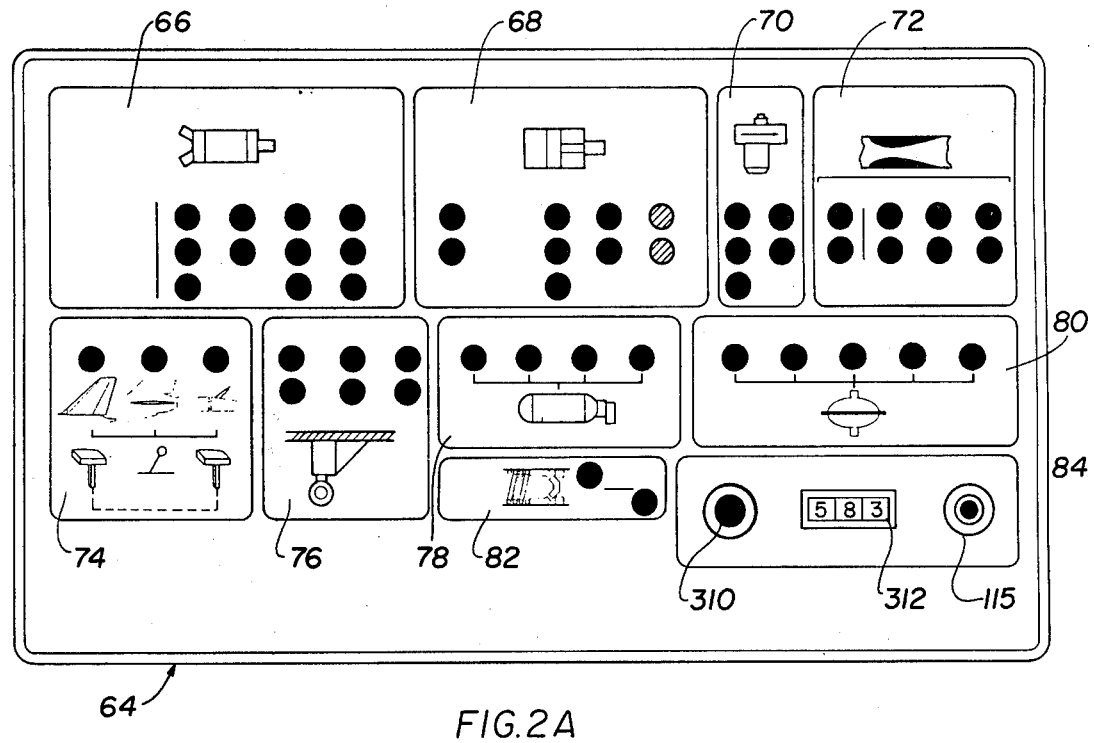
FIGS. 2A and 2B are smaller scaled side views of FIG. 3 showing circuit test and system test functioning respectively.
Figure 2B:
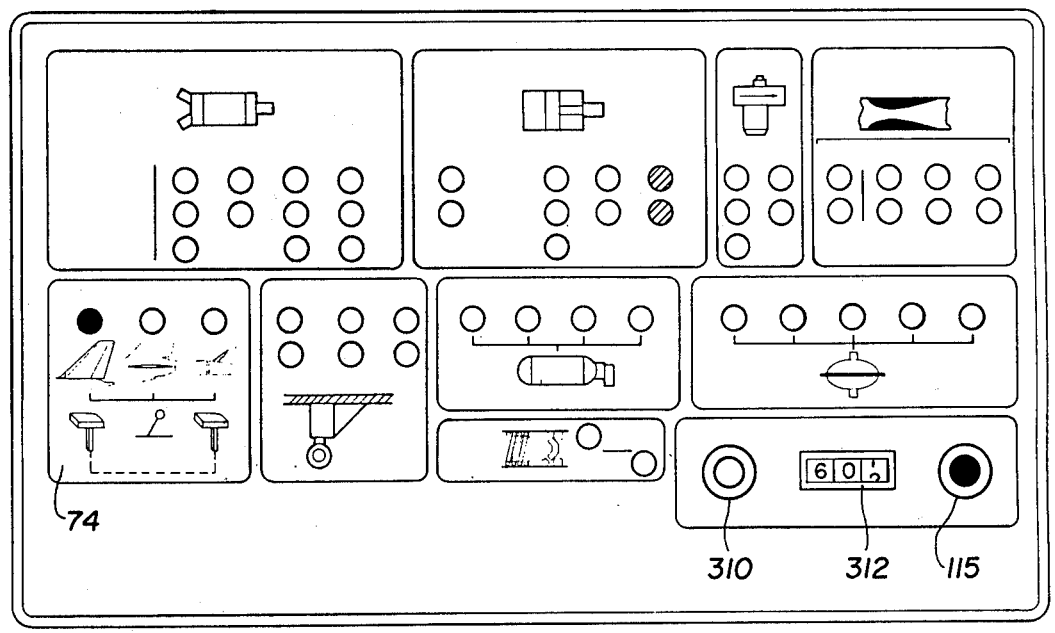

Actually in considering FIGS. 2, 2A and 2B the panel 64 is divided into areas for pumps 66, reservoir 68 filters 70, quiescent flow 72, airplane control surfaces 74, landing gear 76, pneumatic pressure systems 78, hydraulic pressure systems 80, relief valves 82, test actuation and time status 84 whereby the pumps 86 and 88 and their operably related apparatus of FIG. 3 may be monitored. In essence the systems of FIG. 3 are two independent closed loop systems. As is known to those skilled in the art the systems are not fluid interconnected although there may be power transfer from one system to another during emergency conditions.

Normally, both systems operate continuously through the engine driven pumps 86 and 88 with each system supplying partial power for operation of primary flight control means 90, 92 and 94. Either system, however, is capable of operating these primary flight control means should one system fail. As is also known, single or parallel variable delivery pressure compensated hydraulic pumps are usually used on airplane control systems. Hydraulic power generation is usually established at approximately 3000 psi for most systems. Pressure is generated by the variable delivery pumps 86, 88 which compensate for system demand by increased pump piston stroking. With no system demand, the system pressure remains at 3000 psi and the pump only develops enough flow to compensate for system leakage.

When control inputs are fed to the flight control actuators of a rudder 96, stabilizer 98 or flaperon 100 (See blocks 94, 92 and 90 of FIG. 3) they respond in relation to the input signal. The demand of actuator systems 90, 92 and 94 causes the pump 86 primarily responsible to them to maintain pressure for them until and if the system demand exceeds the capability of the pump and storage devices, accumulator 26, at which point system pressure will drop off until an energy equilibrium is reached. As will be readily appreciated accumulator 26 is able to handle momentary peak load requirements.

In any such system as blocked out by FIG. 3 there is to be expected in periods of no demand a system leakage not utilized in operation. In aircraft environments with which this invention has and can be of measurable import this system leakage varies from slightly more than 1% to as much as 7%. This, as is readily understood by one skilled in the art determines system efficiency, i. e. system efficiency is dependent on the allowable system internal leakage of each component which is on line during the various phases or modes of aircraft operation. When a component develops a potential of failure and the component is not isolated from the pressure source, the leakage will increase. In that this normal system is pressure compensated it adjusts to any such demand whereupon mere pressure gauge operation would not be determinative of this abnormal condition. It is therefore that one must first establish normal and abnormal operating parameters of system components such as those mentioned heretofore and the other critical-for-flight systems shown in block form by FIG. 3 — namely, the aircraft landing gear system 104, brake system 106, cockpit systems 108 and landing flap systems 110.

Actually normal conditions are normally those for which these systems were designed over their normal operating pressures temperature and flow ranges. It is thus that in the typical fluid power systems the indicator panel of FIG. 2 has particular adaptability. More particularly such fluid power systems may be monitored in reference to power generation, pump area 66; power processing and transmission, area 80 in addition to 68, and 72; fluid condition determination, area 70; relief valve fluid flow temperature, area 82 and miscellaneous, pneumatic device area 78, landing gear 76 and flight control actuator area 74.

One means to obtain indications for FIG. 2 is shown by FIG. 4 where switches 11, 13 and 15 are responsive to pressure, arrows 17, 19 and 21 for illumination of LED's 23, 25 or 27. These is also shown by FIG. 4 how light pipe technology may be used in transmitting light energy via pipes (fiber optic lines) 29 from an illuminated number 500, as at 31 to reproduce same at indicator location 33 in the backup system section. Similarly fiber optic bundle 35 transmits the FULL indication to indicator location 37.

Switches 11, 13 and 15 are pressure switches responding to loads represented by arrows 17, 19 and 21 so as to with contacts 39 and 41 in each connect battery 43 in the respective circuit for LED's 23, 25 or 27.

The typical LED circuit may be found in FIG. 5 in so far as there is needed a disclosure of such to enable one to manufacture in accordance with the teachings of these Letters Patent. Such typical circuit shows a lead 45 from B+ via resistor 47 and system test switch 49 to manifold lead 51. From lead 51 a light test switch 53 is employed to provide via diodes 55 current via red LED's 57, 59 and 61 so as to check their operability. Switch arms 63, 65 and 67 may also complete the circuit from B+ to ground via resistors 69, 71 and 73.

As is also seen by FIG. 5 it is possible to use in a two color circuit a pair of diodes 75 and 77 connected to a common terminal 79 so as to provide a yellow illumination by combining light from LED's 61 and 81 whenever arm 67 is closing the circuit via terminal 79. It would also be possible to observe green diodes 85, 83 and 81 when switch 49 is closed.

The switch arms 63, 65 and 67 may be equated to the control arms of switches of FIGS. 4, 6, 7, 8, 10, 14A-1, 14B, 15, 16 and 17.

Figure 7:
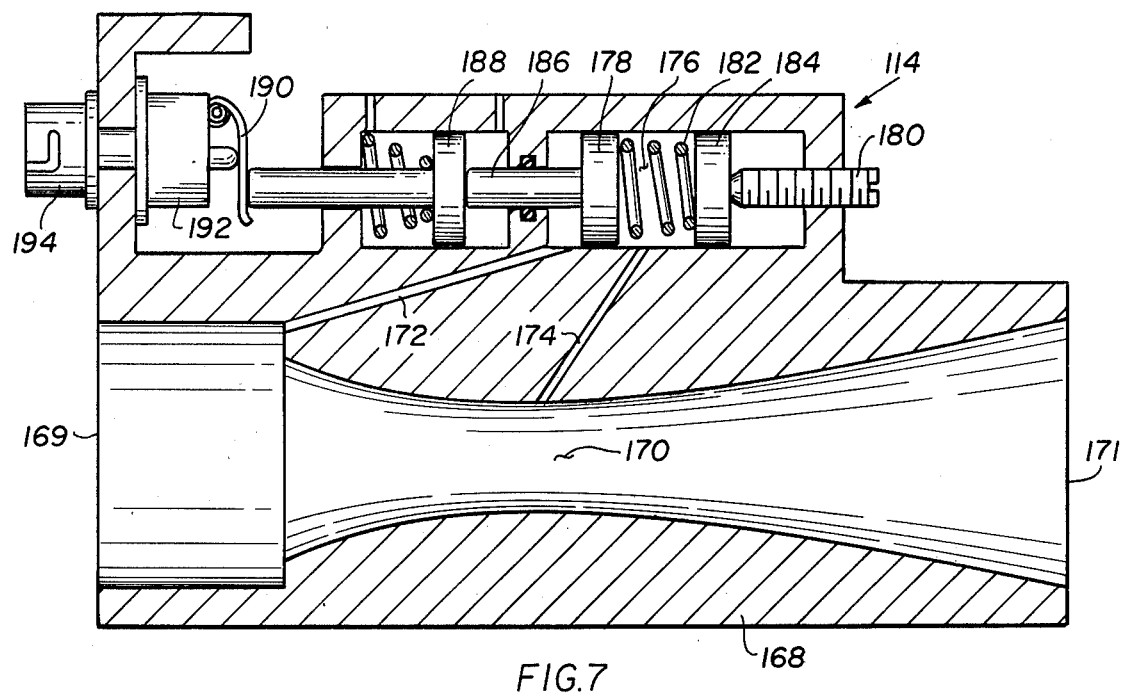
FIG. 7 is a cross-sectional view of an inline fluid flow sensor means.
Figure 8:
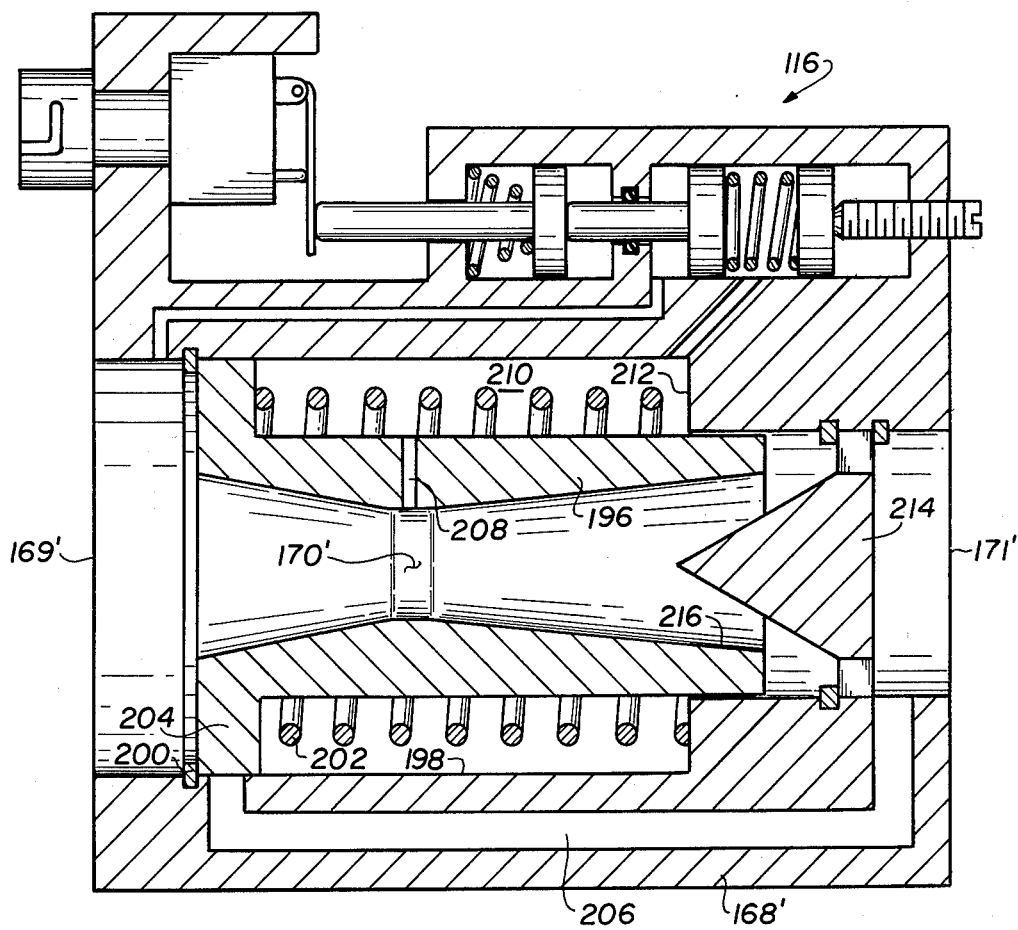
FIG. 8 is a cross-sectional view of a sensor of the type of FIG. 7 having means to bypass flow when demand rate exceeds a predetermined value.
Figure 9:
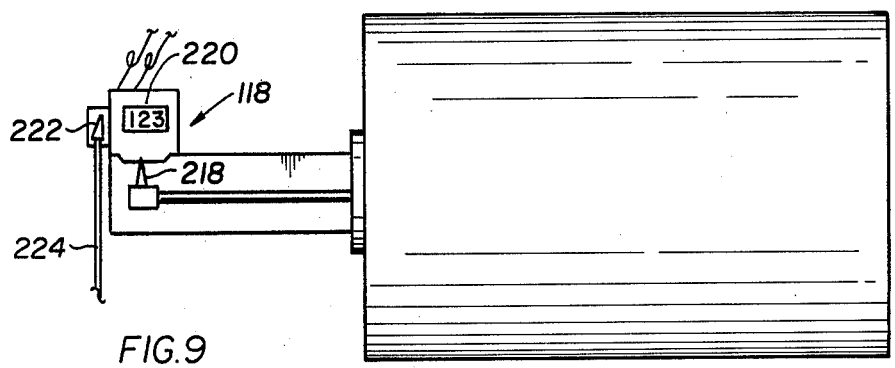
FIG. 9 is a schematic representation of a reservoir with mechanical indicating means for illuminating numerical indicia having fiber optic means to give remote visual reading.
Figure 10:
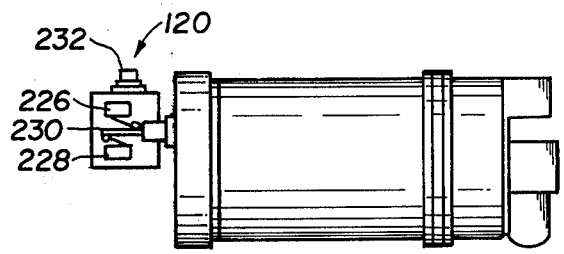
FIG. 10 is another schematic reservoir with microswitch means for full-low signal production for a monitoring means.
Figure 11:
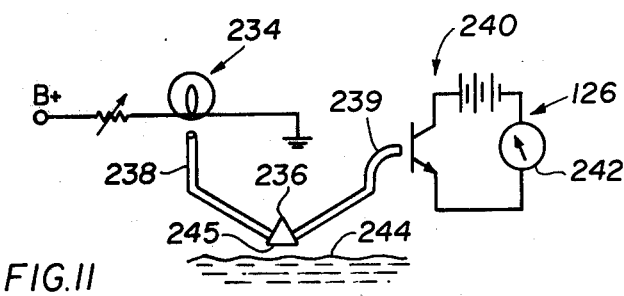
FIG. 11 is a schematic illustration of a fiber optic means with a phototransistor circuit for fluid level measurement.
Figure 12:
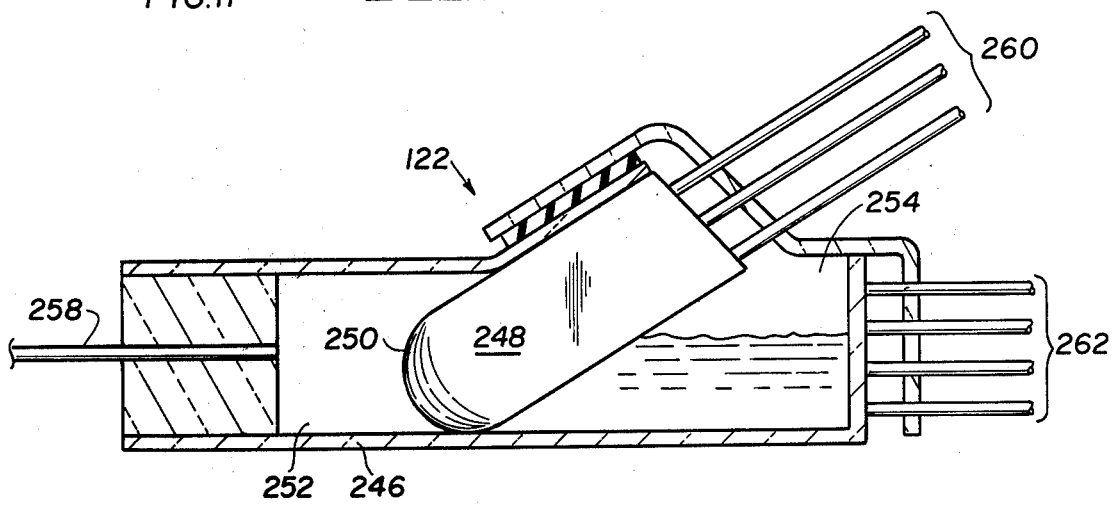
FIG. 12 is a cross-sectioned view of a densitometer to provide light signals of fluid density and condition, i. e. contamination.

In order to operatively relate various systems and components to the indicators there may be installed in the aircraft components like the temperature switch 112 of FIG. 6, the direct flow sensor 114 of FIG. 7, the shunt flow sensor 116 of FIG. 8, the fluid level sensors 118 and 120 of FIGS. 9 and 10, the density contaminant gauge 122 of FIG. 12 and the desiccant saturation monitor 124 of FIG. 13. FIG. 11 is illustrative of known fiber-optic electronic coupling techniques for using light energy levels in controlling an indicator means 126.

As will be readily appreciated by one skilled in the art many and varied switches are available with broad trip settings and adjustable differential pressure electrical readout assemblies are available for insertion in a system by one skilled in the art such that there is no need to detail these articles further. A few are shown by FIGS. 14A, 14A-1, 14B, 15 and 16. More specifically in FIG. 14A and 14A-1 there is shown means, somewhat like in FIGS. 9 and 10 to be further described later, to produce an electrical signal proportioned to displacement of a tape 87 having apertures 89 spaced therealong for a switch plunger 91. Similarly a micro-switch 93 could be employed to be operable by a rod 95 having grooves 97 within which follower 99 may roll upon reciprocation of the rod to cause arm 101 to operate the switch 93.

Reed switches 103 and 105 may be used with a polarized plunger 107 with a north land 109 and a south land 111, as well as a Hall effect switch 113 with a similar plunger 107' having north land 109' and south land 111'. These arrangements are used as limit switches that could be employed to signal fluid quantity in a tank, i. e. reservoirs (See FIG. 1). One could compensate for any volume change due to temperature with such devices by positioning such in mounts having bimetallic actuators for locating same, as is readily known by one skilled in the art.

With reference again to FIG. 6 there is shown a type of temperature switch that can be employed in a pump case drain line and system reservoirs, such as the flight system reservoir and the combined system reservoir. This switch 112 includes a high thermal conductive body 152 having threaded end 154 and a chamber end 156. A plunger 158 is operatively arranged to project in the chamber end for operation of a bimetallic Belleville Washer 160 in control of microswitch 162 connected to an appropriate indicator on panel 64 by connector 164. With this switch design there is also provided a manual reset and visual indicator 166. With such a switch 112 the thermal activation will be preserved for indication even though temperature reverts back to normal operating or ambient after shutdown of the system. Therefore, a high temperature excursion is possible or subsequently being called to the attention of someone viewing panel 64 at location 62 operating system test command means 115. The system temperature expands a bellows 117 to control plunger 158.

Flow sensors such as may be used with this invention of the direct flow type are shown by FIG. 7. There it is shown that a housing 168 has a fixed venturi 170 between inlet 169 and outlet 171. The housing is bored to communicate inlet pressure by a passage 172 and venturi pressure by a passage 174 to a valve chamber 176 at locations, as shown by FIG. 7, to be on opposite sides of a movable wall 178. The static position of wall 178 is adjusted by means of set screw 180 decreasing the bias of spring 182 by wall 184. Wall 178 has an integral rod 186 extending to contact a switch piston 188 controlling a switch arm 190 of switch 192 controlling signals via electrical connection 194 to the appropriate panel indicator.

The shunt flow sensor of FIG. 8 is similar in construction to that of FIG. 7 except that instead of a fixed venturi there is assembled a movable sleeve 196 within a counterbore 198 of housing 168' between inlet 169' and outlet 171'. Sleeve 196 is located by C-ring 200 and spring 202 so as to have a flange 204 valving a passage 206. Sleeve 196 is itself bored to have a passage 208 leading from the center of venturi 170' to the chamber 210 between flange 204 and housing wall 212. A conical plug 214 is staked within outlet 171' so as to operate with sleeve 196 to variably restrict nozzle 216 as sleeve 196 moves toward plug 214.

FIGS. 9 and 10 show in outline form typical state of the art means to provide level sensing and readout by various means. More particularly in FIG. 9 a pointer 218 is used to activate a lighted digital readout 220 connected to an electrical source by leads shown. The lighted digit is picked up by lens 222 and transmitted by coherent light pipe 224 to the appropriate panel indicator to indicate fluid level condition of reservoir 36.

FIG. 10 is another state of the art level signal generating means having microswitches 226, 228 cammed by plunger 230 to switch signals via connector 232 to a panel indicator. FIG. 11 may still be another way of obtaining fluid level indication using a light source 234 conducted to an optical interface 236 by a conducting light pipe 238. A transmitting light pipe 239 will activate semiconductor 240 for controlling indicator 242 whenever fluid 244 is not covering side 245 of interface 236. Further details of an improved system of this general type can be observed by a reading of U.S. Pat. No. 3,995,168 assigned to the common assignee herewith entitled Electro-Optical Fluid Measurement System issued Nov. 30, 1976. Also shown as being a possible sensor in this invention is a densimeter/contaminant detector 122 of FIG. 12 from the aforesaid patent. For particular details of this detector reference should be made to that application.

However, a general description of its structure may be stated to include a clear housing 246 within which is adapted a lens 248 having a spherical end 250 between and partitioning chambers 252 and 254, the latter being open to the fluid whose density and contamination is to be observed. At one end a light pipe 258 brings a light source to chamber 252. The amount of light then computed in individual light pipes of fiber optic bundles 260 and 262 then will activate appropriate photo transistors, as an example, (See FIG. 11) to activate an appropriate panel indicator.

With reference now to FIG. 13 there it is shown how one may obtain an indication of the condition of the system air drier. This structure includes a molecular sieve chemical drier 124 known to the art connected, as at 266, to a source of pressurized air, engine compressor bleed air, to which is mounted a housing 268. Air is exhausted via outlet 270 after having passed by a color sensitive outlet disc 272 to which a light source 274 and a fiber-optic transmitting means 276 is communicated as by passages (fiber optics) 278 and 280. As the disc changes color to show amount of moisture passing cartridge 124 this color is communicated to an indicator position on the panel 64.

One further important component to be monitored that is separately provided for in area 76 of panel 64 (See FIG. 2) is the landing gear 264 of FIG. 17. In such components factors which affect proper servicing are its air pressure and its fluid level plus aircraft load. Remote sensing can be accomplished with a fiber optic probe 265, a rotary potentiometer 130 on the scissor linkage such as shown by the remaining figures and readily adaptable to this problem by one skilled in the art. As seen one can use pipes to indicate displacement by locating such to be normally interrupted by a land 271 between grooves 273 and 275 which when opposite light source 277 will permit fiber optic bundle 279 to conduct light to an appropriate indicator. (See FIGS. 18A and 18B).

Figure 19A:
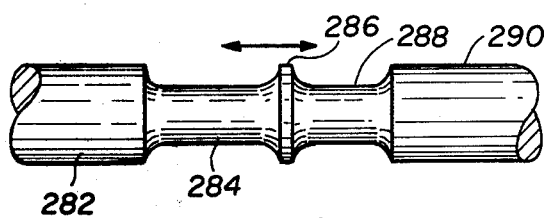
Figure 19B:
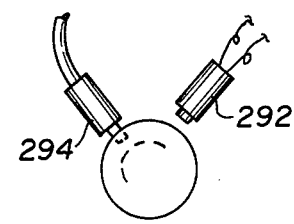

As for the indication by way of fiber optics suggested by FIGS. 19A and 19B there rod 282 has colored areas 284, 286, 288 and 290 of distinctively different coloring. By using light reflected from such colored surfaces from a source 292 a fiber optics light guide 294 can indicate at the display board the position of the piston as a function of color.

Figure 18A:
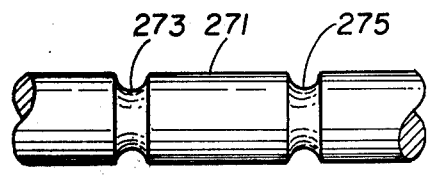
FIGS. 18A, 18B, 19B, 20A, 20B, 21A and 21B show schematically means to use fiber optics for indication of system parameters necessary for illustration by this invention.
Figure 18B:
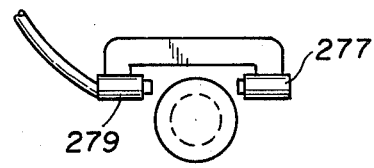
Figure 20A:
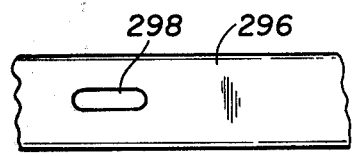
Figure 20B:
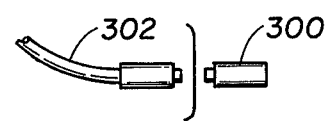
Figure 21A:
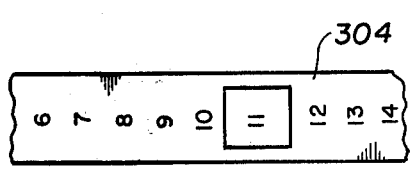
Figure 21B:
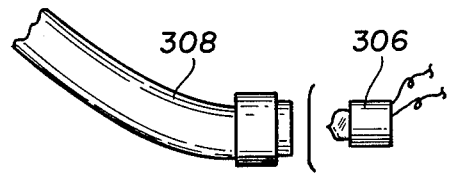

The fiber optic indicator of FIGS. 20A and 20B uses a tape 296 having an aperture 298 with a properly located light source 300 and fiber optic light guide 302 much as the structure of FIGS. 18A and 18B to provide indicative monitoring for panel indicators at station 62 of airplane 10. In conclusion with reference to FIGS. 21A and 21B it is also shown how one can use a coherent light or image-producing light guide with a tape 304 having spaced indicative numbering that can be illuminated by a light 306 and displayed by coherent light guide 308 familiar to one skilled in the art similar to that suggested for FIG. 9.

Therefore, with the above knowledge of the structures described, one skilled in the art will be able to obtain signals of a system as it was last operating and/or is now operating. These signals are then capable of indication on call at a panel on the surface of the airplane so that the ability to stay in service is readily made known to ground personnel without the need for ground testing and ground support test equipment.

OPERATION

As will be readily appreciated from all the foregoing this invention has applicability to installations where various systems are to be monitored at various if not sundry locations by providing a readout and selector panel at a controlled location. As will also be appreciated this to work will require numerous strategically located continuously active sensing elements capable of providing in many instances on-site indication of signaled problems and economical signal transmission to the control station. This has been accomplished by the foregoing described structure, as will be gleaned from such description, the selector/readout panel 64 is the key element of this patent. This panel is inclusive of a button 310 for monitoring its own indicators, i. e. circuit test control, and an elapsed time meter 312 to record the time when components having known maintenance schedules are to be serviced. It should be noted that the elapsed time meter by definition is a timing device readily available in the market place operative only when the components to be monitoredare functioning.

As seen in FIG. 2A the circuit test button having been depressed would cause the illumination of the LED's similarly darkened. With such it could be expected that all systems are go. The drier indicators being coherent light guides of color at the discs 272. If during this operation any of the indicators did not operate then the circuit itself would have to be checked out. If as seen in FIG. 2A all were operating then the systems check could be initiated, i. e. button 115 would be operated as in FIG. 2B. Upon operation of button 115 all the indicators should go out save for color at light guide faces for the drier, as shown. However, in the test of the systems depicted by FIG. 2B the rudder indicator remained lit, see area 74 of FIG. 2B. This would indicate that the rudder actuation system has a problem, or more specifically that there has occurred a discontinuity between the rudder pedals and the rudder actuator. In this as in most cases when one gets an indication of a problem on panel 64 the first thing to do is to check the component the indicator references to see if the compansion visual indicator with the component shows a problem in corroboration of that on panel 64. By way of a more definitive description of the procedures for the use of panel 64 the following table is offered:

CHECKOUT SEQUENCE OF OPERATION

| STEP | CHECKOUT LOGIC | SIGNAL | CONDITION |
|---|---|---|---|
| 1. | Supply electrical power to vehicle | | |
| 2. | Open access panel 62 to actuate circuit | Activates circuit to flow sensors | System ready for interrogation |
| 3. | Press and hold circuit test button 310 | | |
| | (A) All LED's illuminate | All LED illuminate | System circuits complete |
| | (B) All LED's do not illuminate-faulty LED do not illuminate-faulty circit or LED repair or replace as required | All LED or circuit faulty luminate | |
| 4. | Press and hold system test button 115 | | |
| | (A) Read static sensors | | |
| |    1. Filters (ΔP) | Pressure return or case filter indication | Indicates contaminated system. Potential failure mode or lack of servicing. Replace or repair as required. |
| |    2. Strut pressure & level | Low level leaking strut | Possible damage to structure of due to hard landing |
| |    3. Pneumatic bottle pressure | Low pressure | Loss or emergency gear blowdown backup |
| |    4. Accumulator pre-charge | Brake Accumulator | Loss of reverse braking |
| | | R.A.T. Accumulator | Loss of emergency Power |
| |    5. Pump case flow temperature | Pump case temp illuminated | Low fluid level - potential pump failure |
| |    6. Desiccant drier condition | Readout changes from Pale blue to pink | Saturated bleed air moving to reservoir |
| |    7. Relief valve (overtemp) | Relief valve LED illuminates | Indicates leaky relief valve |
| |    8. Pump case flow | Pump case flow LED illuminates | Indicates potential pump failure if temperature & case filter LED illuminates replace pump |
| 5. | Start airplane engine (no control input) press and hold system test button | | |
| | (A) Read dynamic sensors | | |
| |    1. Pressures | Illuminated LED indicates low system or reservoir pressure | Check system relief valve or pneumatic reservoir pressure reducer |
| |    2. Reservoir | | |
| |       Air | Air LED illuminates | Bleed air from system |
| |       Level | Level LED illuminates | Add fluid to reservoir & bleed, as necessary |
| |    3. Quiescent flow | | |
| |       System | System quiescent flow LED illuminates | Check flight control actuators quiescent flow LED. If none illuminated, check system components for bypass |
| |       Flight control actuators | Flight control actuator LED | Recycle & pressurize system - if LED illuminates. Replace actuator |
| |    4. Differential displacement | differential displacement LED illuminates | Check input output linkage |
| |    5. System hours | | |
| 6. | If panel indicates out-of-limit readout, shut down engines | | |
| | (A) Verify questionable component with a mechanical readout (as applicable) | | |
| | (B) Replace or service out on tolerance component - utilize system hours reading on panel for recording time log on replaced or serviced part | | |
| 7. | Manually reset mechanical indicators after corrective action has been taken | | |
| 8. | Repeat checkout to verify that condition has been corrected (Q/A function) | | |
| 9. | Close access panel. | | |

Having described an operative system with varied structure to make it so it is now desired to set forth the protection of these Letters Patent as follows

I claim:

1. Means to monitor fluid system characteristics after system operation at a control station on the exterior surface of an airplane employing such fluid system, said means to monitor comprising:
   an accessible selector/read-out panel on the exterior surface at the control station;
   visual indicators to provide visual information of the system performance characteristics such as temperature, flow, pressure, volume, differential pressure, contamination, and time of operation, said indicators being grouped into several categories of the system on said selector/read-out panel;

means connecting said indicators to signal switch apparatus so as to operate said indicators such that said indicators will provide visual indication of signals from said switch apparatus to inform of a systems previous inflight and postflight operational characteristics, problems and need for maintenance; and switch means on said panel, said switch means operably connected with said switch apparatus and said indicators to provide system test and a test of the operativeness of the indicators to corroborate said indicators' ability to provide indication of system characteristics.

2. On an airplane having a plurality of pneumatic and hydraulic systems and components each with some device to monitor operation of same, an indicator panel on a side of the fuselage of the airplane located for visual observation during ground check of the airplane to show malfunctions and potential problems, said indicator panel comprising:

a panel door on the exterior surface of the airplane, said door fairing with the exterior surface in protection of said indicator panel;

a plurality of indicating elements grouped on the indicator panel for various systems and components on the face of the panel to be exposed by opening of the door, said elements being inclusive of light emitting diodes, digital read-outs, color transmitting devices, clock information to provide indications of a systems previous inflight and postflight operation and time elapsed of system operation and condition for resuming operation; and p1 controls on the panel protected by the door when closed to check operational status of the elements and activate the panel to show system, component status.

3. A checkout panel accessible from outside of a vehicle, said panel comprising:

a plurality of indicators of varied type such as light emitting diodes, digital character readouts, color discs, clock representations, said indicators being grouped to show condition of power generation, control operator/actuator condition, hydraulic source condition and pneumatic source condition, i.e. filter condition, fluid contamination, accumulator pressure, valve operation, said indicators also including an indicator test circuit switch on said panel to corroborate their ability to function; and means within the vehicle to provide signals for operation of each of said indicators in monitoring various vehicle systems previous and, as desired, present operation.

4. An airplane comprising:

a ground-accessible selector read-out panel on the exterior surface of the airplane;

a plurality of signal generating means connected to components of vital systems of the airplane;

miniature indicators grouped on the selector read-out panel operably connected to said signal generating means of said components;

first switch means on said panel operable to corroborate the ability to function of said indicators in monitoring the operation of said components; and second switch means on said panel to operate said indicators receiving signals from said signal generating means to indicate postflight readings of inflight operational characteristics of component function and readiness to function.

5. An airplane having the usual pneumatic and hydraulic systems for operation and control thereof said airplane comprising:

a plurality of components in the pneumatic and hydraulic systems;

a plurality of signal generating means to provide signals of malfunction of said components and systems;

an exteriorly located ground-accessible selector read-out panel on the airplane;

indicator means grouped according to components and systems on the face of said panel to be viewable exteriorly of the airplane while on the ground for checking previous inflight and postflight operation of said components and systems, said indicator means being inclusive of fluid power system monitors, of power generation, of power processing, of power transmission, of fluid condition, of fluid source reserve, temperature, density, contamination; and component operation monitors of valves, of struts, and of actuators, first switch means on the panel connecting signal generating means and said indicator means to activate said indicator means as are showing previous inflight and postflight component and system status; and second switch means on said panel to activate said indicator means in testing their ability to function.

* * * * *